No. 698,493. Patented Apr. 29, 1902.
A. HERSCHMANN.
VEHICLE.
(Application filed Oct. 18, 1901.)
(No Model.)
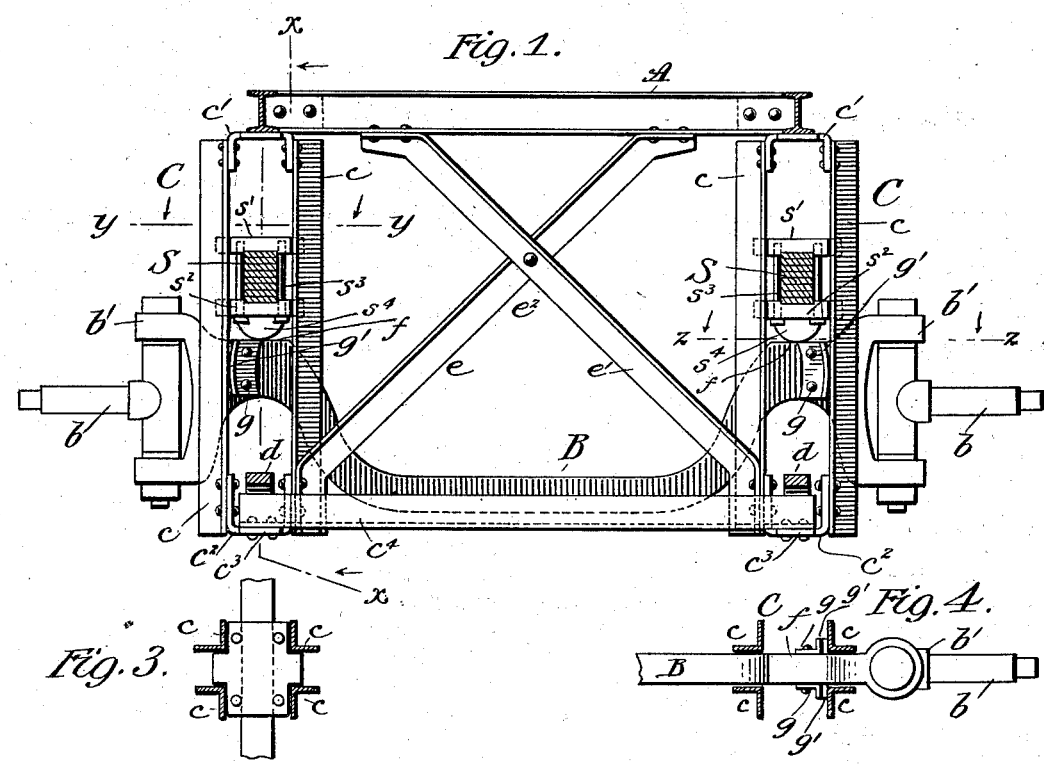
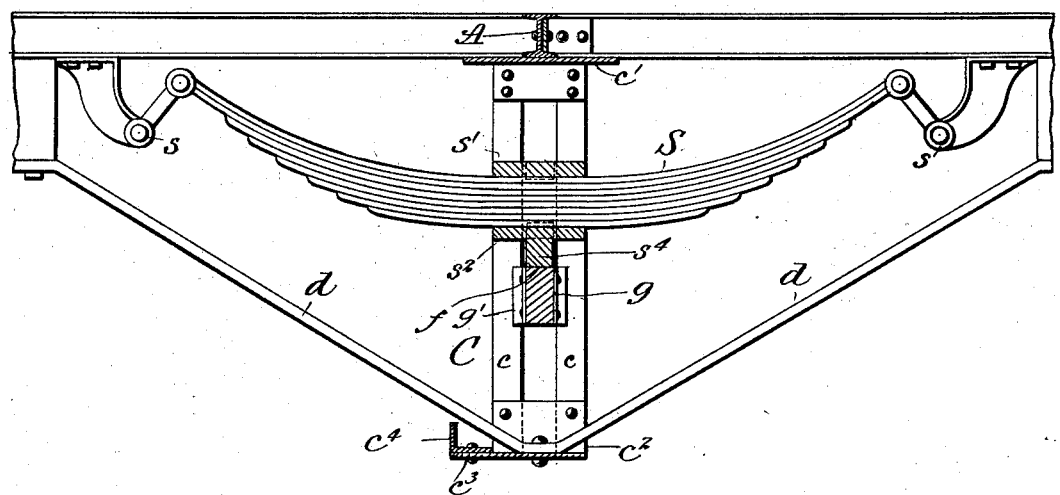
Witnesses
Frank A. Ober
Waldo M. Chapin
Inventor
Arthur Herschmann
By his Attorney
Wm. Rosenbaum

UNITED STATES PATENT OFFICE.

ARTHUR HERSCHMANN, OF NEW YORK, N. Y.

VEHICLE.

SPECIFICATION forming part of Letters Patent No. 698,493, dated April 29, 1902.

Application filed October 18, 1901. Serial No. 79,150. (No model.)

*To all whom it may concern:*

Be it known that I, ARTHUR HERSCHMANN, a subject of the Emperor of Austria-Hungary, residing at the city of New York, in the borough of Manhattan and State of New York, have invented certain new and useful Improvements in Vehicles, of which the following is a full, clear, and exact description.

This invention has reference to the running-gear of vehicles, and specifically relates to the manner of mounting one of the axles of a four-wheeled vehicle whereby the vehicle will always be supported without strain, regardless of the irregularity of the surface over which it runs. It is well understood that a vehicle supported at three points only, such as a three-wheeled vehicle, cannot be subjected to strains by reason of an uneven road, since three points can always locate themselves in a single plane. Efforts have been made to achieve substantially the same result in a four-wheeled vehicle by pivoting one axle at its middle point upon a horizontal fore-and-aft axis, which allows the axle to rock and adjust itself to the irregularities in the road. This method of support, however, is not entirely satisfactory on account of the strains brought upon the pivotal point of the axle and upon the springs, and for other reasons.

The object of my invention is to achieve the same result as to the three-point support of the vehicle in a construction which will be strong and will avoid undue strains upon the various parts of the vehicle structure. I accomplish this by placing one axle between vertical guides projecting downward from each side of the vehicle-body and allowing the vehicle to bear, through its springs, freely upon the upper side of the axle. The axle being thus confined will communicate or receive its strains through the vertical guides and the body of the vehicle to or from the second axle, and in this way I also dispense with the usual rigid fore-and-aft braces connecting the ends of the two axles together, the weight of such braces being thereby eliminated and their function of transmitting the strains performed by the body of the vehicle. By resting the springs freely upon the top of the axle in the manner hereinafter described I also avoid transmitting strains through them.

My invention will be described with reference to the accompanying drawings, in which—

Figure 1 is a front elevation of the axle and its connections with the body of the vehicle. Fig. 2 is a section on line $x\,x$ of Fig. 1. Fig. 3 is a section on line $y\,y$ of Fig. 1, and Fig. 4 is a section on line $z\,z$ of Fig. 1.

The floor-beams of the vehicle are indicated by A and the axle by B. My invention being preferably applied to a motor-vehicle, the axle illustrated is supposed to be the front axle, the wheels being hung upon the usual stud-axles $b$, pivoted vertically in the brackets $b'$ for steering purposes. As shown, the axle is dipped downward in its middle portion; but this is not essential. On each side of the vehicle-body and in the plane of the axle are arranged two vertical guides C C. Each of these guides consists of four upright L-irons $c$, arranged to form the four corners of an open-sided box structure. These uprights are connected together and to the floor of the vehicle-body by means of U-shaped plates $c'$ above and $c^2$ below. The lower plates have projecting lips $c^3$, which are connected together by a cross-brace of L-iron $c^4$. To support the guides in a fore-and-aft direction, the braces $d$ are provided, which are bolted to the vehicle-body in front and rear of the guides and extend diagonally to and through the lower end thereof. For further rigidity of the structure the lower end of each guide is braced laterally by the diagonal L-irons $e$ and $e'$, which cross each other and are bolted together at $e^2$, and are secured to the floor by means of the vehicle-body. The axle B passes laterally through the opposite sides of each guide, and inside of the guides the upper surface of the axle is flattened at $f$ to furnish a table upon which the springs may rest. The springs are preferably of the semi-elliptical form and are indicated by S. Their extremities are secured by links and brackets $s$ in the usual way to the body of the vehicle, and they pass through the opposite sides of the guides in a direction at right angles to the axle, or fore and aft of the vehicle. Inside of the guides the spring is embraced by a clip consisting of upper and lower plates $s'$ and $s^2$, respectively, connected by bolts $s^3$. The lower plate is provided with a semicylindrical shoe $s^4$, the periphery of which rests upon the flat surface $f$ on the top of the axle, the connection between the spring and axle thus being entirely free and dependent upon the weight of the vehicle. The middle point of the spring is given support and held in position by the clip, the plates of which are shaped like a cross to enter the four openings in the sides of the box-like structure. The movements of the spring in compressing and expanding are thus controlled. To the front and rear faces of the axles, inside of the guides, are secured the flanged plates $g$, having curved surfaces $g'$ facing against the outer members $c$ of the guide. The curvature of these faces is on a center substantially in the mid-line of the vehicle. These plates prevent lateral movement of the axle and at the same time permit it to assume an angular position with respect to the floor of the vehicle-body without undue friction upon the guides.

It will be seen that this structure permits the two wheels on the axle to rise and fall independently of each other and without throwing strain upon the guides or other parts of the vehicle. The springs perform their function without being subjected to fore-and-aft or lateral strains. When the angle of the axle changes with respect to the springs, the rolling motion of the part $s^4$ provides the necessary adjustment to avoid straining. The communication of strains between the axles is effected through the vertical guides along the vehicle-body and through the connection between the body and the rear axle to the latter.

The herein-described structure is especially adapted for self-propelling wagons or trucks of the heavy type.

Having described my invention, I claim—

1. In a vehicle, the combination of the body and an axle, with vertical upright guides connected with the body on each side thereof and through which the axle projects, and springs attached to the body at points in front and rear of the guides and passing through said guides and resting freely on the top of the axle therein, substantially as described.

2. In a vehicle, the combination with the body and an axle, of vertical guides secured to the body and having passages through them in two planes at right angles to each other, the axle passing through and guided by the openings in one plane and springs passing through and guided by the openings in the other plane.

3. In a vehicle, the combination with the body and an axle, of vertical guides secured to the body, each consisting of four uprights placed at the corners of a rectangle and forming a box-like structure through which the axle projects and in which it is guided, the axle being provided with curved surfaces bearing against the inner sides of the outer uprights, respectively.

4. In a vehicle, the combination with the body, and vertical guides carried thereby and consisting of four braces forming an open box-like structure, of semi-elliptical springs passing through the open sides of said guides and having attached thereto a clip engaging with the guides to support and guide the springs, substantially as described.

5. In a vehicle, the combination of a body, an axle mounted free to assume an inclined position with respect to the floor of the body, a spring interposed between the body and the axle and resting freely upon the latter and a curved shoe interposed between the spring and the axle affording a rolling motion when the axle assumes an inclined position with respect to the floor of the body and means for maintaining the spring in its working position.

6. In a vehicle, the combination of a body, an axle mounted free to assume an inclined position with respect to the floor of the body, an elliptical or semi-elliptical spring interposed between the body and the axle, resting freely upon the latter and occupying a plane at right angles to the axle and a curved shoe interposed between the spring and axle, affording a rolling motion when the axle assumes an inclined position with respect to the floor of the body.

In witness whereof I subscribe my signature in presence of two witnesses.

ARTHUR HERSCHMANN.

Witnesses:
WM. A. ROSENBAUM,
FRANK S. OBER.